(12) United States Patent
Farawila

(10) Patent No.: US 6,301,321 B1
(45) Date of Patent: Oct. 9, 2001

(54) COMPOUND WATER CHANNEL SYSTEM FOR BOILING WATER REACTOR FUEL ASSEMBLIES

(76) Inventor: Yousef M. Farawila, 1900 Stevens Dr. 811, Richland, WA (US) 99352

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/354,068

(22) Filed: Jul. 14, 1999

(51) Int. Cl.[7] .................................................. G21C 3/326
(52) U.S. Cl. ............................................. 376/444; 376/350
(58) Field of Search ..................................... 376/349, 350, 376/351, 352, 435, 443, 444

(56) References Cited

FOREIGN PATENT DOCUMENTS

E0052999 * 12/1984 (JP).

* cited by examiner

Primary Examiner—Charles T. Jordan
Assistant Examiner—Kyongtaek K. Mun
(74) Attorney, Agent, or Firm—Liebler, Ivey&Connor; Floyd E. Ivey

(57) ABSTRACT

A new design concept of boiling water reactor fuel assembly water channels is disclosed. The new design utilizes parallel flow paths guided inside an outer conduit without reversing flow. The different flow paths discharge water into the coolant stream, which is the objective of this invention, and resulting in improvements in thermal efficiency and stability of the fuel assembly. The thus diverted flow paths discharge water evenly into the coolant stream, which is the objective of this invention, with the result of improving the thermal efficiency and stability of the fuel assembly.

8 Claims, 2 Drawing Sheets

COMPOUND WATER CHANNEL SYSTEM FOR BOILING WATER REACTOR FUEL ASSEMBLIES

FIELD OF THE INVENTION

The present invention relates to nuclear fuel assemblies for boiling water reactors (BWR). More specifically, a new design concept for water channels is disclosed for improving the fuel performance in said reactors.

BACKGROUND OF THE INVENTION

Boiling Water Reactors (BWR) designed for power generation utilize fuel assemblies arranged inside vertical channels through which water coolant is injected. Each of the fuel assemblies consist of a plurality of vertical rods arrayed within the said vertical channels. The said rods are sealed cylindrical tubes inside which ceramic pellets of fissionable material, e.g. uranium oxide, are stacked. The water flows upward in the channels and removes the heat generated in the pellets by the fissioning of the heavy isotopes. In addition to its cooling function, the water serves a neutron moderator. The said moderator function is achieved as the neutrons produced in the fission process collide with the hydrogen atoms in the water molecules and slow down to lower energies which increase the probability of inducing further fission reactions and the fission chain reaction is sustained.

In boiling water reactors, the water is allowed to boil as it travels up in the fuel assembly channel. The density of water is reduced by the boiling process and the moderating function is adversely affected particularly in the upper portion of the fuel assembly, where the fuel-to-moderator ratio becomes higher than optimally desired. This problem was mitigated by introducing one or more water rods or channels, henceforth called water channels, A water channel is a hollow tube or conduit extending vertically along the fuel rods, and through which part of the water flows without boiling. Thus, the amount of water available for the neutron moderating function is increased. The said improvement in the moderation function comes at the expense of reducing the amount of water available for the cooling function. This is obviated by the fact that the total amount of water flowing through a given fuel assembly is limited. The diversion of part of the coolant water to water channels may result in reducing the maximum power that can be safely produced by a fuel assembly containing such water channels, and imposes economically undesirable limitations on the reactor core design and reactor operations.

The amount of coolant diverted to flow through the water channel is determined by the need to maintain its liquid state (no boiling) so that the hydrogen atom density remains high for the neutron moderation function. As the neutrons give off their kinetic energy to the moderator, the moderator enthalpy (and temperature) rises. An additional source of energy deposition in the moderator is the absorption of gamma rays produced in the fission process. As moderator boiling in the water channel defeats its purpose, there must be sufficient flow through the channel such that the neutron and gamma energy deposited in the water channel is less than the water subcooling at the inlet, where the subcooling is defined as the enthalpy of saturated water less the enthalpy of the entering water. The amount of water diverted to flow in the water channel to avoid boiling can be as high as ≈5% of the total flow.

Attempts were made in the prior art to save the water channel flow for cooling function by adding a flow path starting at the top of the water channel and guiding the water flow in reverse to be re-injected into the cooling stream at a lower elevation. Such attempts were not successful because the water column between the re-injection point and the top of the water channel structure becomes unstable, where steam can be entrapped in that space defeating the purpose of the water channel. Reinjection water channels have been abandoned in practice in favor of once-through tubes.

The water channels of the prior art can be useful for enhancing the stability of BWR cores as explained qualitatively hereunder. For a stable operation of a BWR, a small perturbation of the flow rate entering the bottom of fuel assemblies must not grow into larger fluctuations. The mechanism for such possible growth depends on various time delay and feedback strength of various thermal-hydraulic and neutronic interactions. Consider a small sinusoidal inlet flow perturbation The initial small increase in inlet flow will result in decreasing the voiding of the cooling water at higher elevations. The said decrease in voiding travels upwards along the fuel rods creating the well-known density wave. Thus, the effective increase in the total pressure drop across the assembly is delayed by the time it takes the said density wave to travel from the bottom single-phase region to the two-phase region in the top section of the assembly. If the said delay time is equal to half the period of the initial sinusoidal perturbation, an oscillation of such frequency can be potentially amplified, as the said increase in the flow resistance coincides and reinforces the flow decrease of the second half of the inlet flow perturbation. Such oscillations are likely to grow if the two-phase pressure drop occurring in the top section of the assembly (the delayed component) is large compared with the single-phase pressure drop occurring in the bottom section of the assembly. An additional feedback mechanism is provided by the fission power response to said density wave. The density wave is equivalent to a change in the moderator density, which directly changes the nuclear reactivity. The change in said nuclear reactivity produces a change in the fission power deposited inside the fuel rods with a small time delay. The said change of fission power is released into the cooling flow with a time delay associated with the heat conduction in the fuel rods. The result of this energy transfer response to the coolant is a corresponding change in voiding of the coolant and pressure drop that reinforces the initial inlet flow perturbation. For such neutronic feedback to be effectively destabilizing, large void/reactivity coefficient (large reactivity response to change in coolant voiding) is necessary.

The water channels of the prior art influence the stability of density waves in BWR fuel assemblies in two opposing ways:

1. The water channel flow diverts flow from the coolant path, and thus increases the void content and length of the two phase region in the upper section of the assembly, thus increases the two-phase pressure drop relative to the single-phase pressure drop. This effect is destabilizing. An additional secondary effect is the shift of neutron flux distribution to the bottom of the assembly due to the decrease in moderator density in the top of the assembly. The said shift of neutron flux is associated with similar shift in the axial fission power distribution towards the bottom of the assembly. This increase in the bottom power results in coolant voiding at lower elevation, which is a destabilizing effect as explained earlier.

2. The water channel creates a moderator zone that is not affected by the boiling process, and therefore the effect of the boiling of the coolant outside the water channel on the nuclear reactivity is reduced. This reduction in the magnitude of the overall void/reactivity coefficient is stabilizing.

Although the combined effect of the water channel on the density wave stability has been generally favorably, the new water channel concept is far more effective in stabilizing a fuel assembly by influencing different mechanisms that were not affected in the prior art.

It can be concluded that a new design concept for water channels is needed for the purpose of reducing their negative impact on the thermal performance of boiling water reactor fuel assemblies. Also, a new design of water channels that improves the stability performance in new ways is also useful.

BRIEF SUMMARY OF THE INVENTION in accordance with the present invention, a new design concept of water channel for BWR fuel is introduce for the purpose of optimizing flow distribution between cooling and neutron moderation functions. The new design concept utilizes one or more internal flow paths with varying flow velocities and discharge locations as described in the next section. The new water channels work by increasing the amount of water available for cooling and thus enhance the thermal performance of a fuel assembly, and also introduces stabilizing effects to dampen density wave oscillations.

BRIEF DESCRIPTION OF THE DRAWINGS

FIG. (1) is a sketch of the axial elevational cross sectional view of the new water channel system. It depicts the main body outer channel, and the internal narrow tube structure. The two flow paths are marked at inlet and exit. The height of the sketch relative to its width is smaller than the realistic proportions.

FIG. (2) is a similar sketch to FIG. (1), representing the next higher order embodiment of the new water channel system. There are two concentric narrow tubes inside the main body outer channel. The three flow paths are marked at inlet and exit.

DETAILED DESCRIPTION OF THE INVENTION

Figure 1:
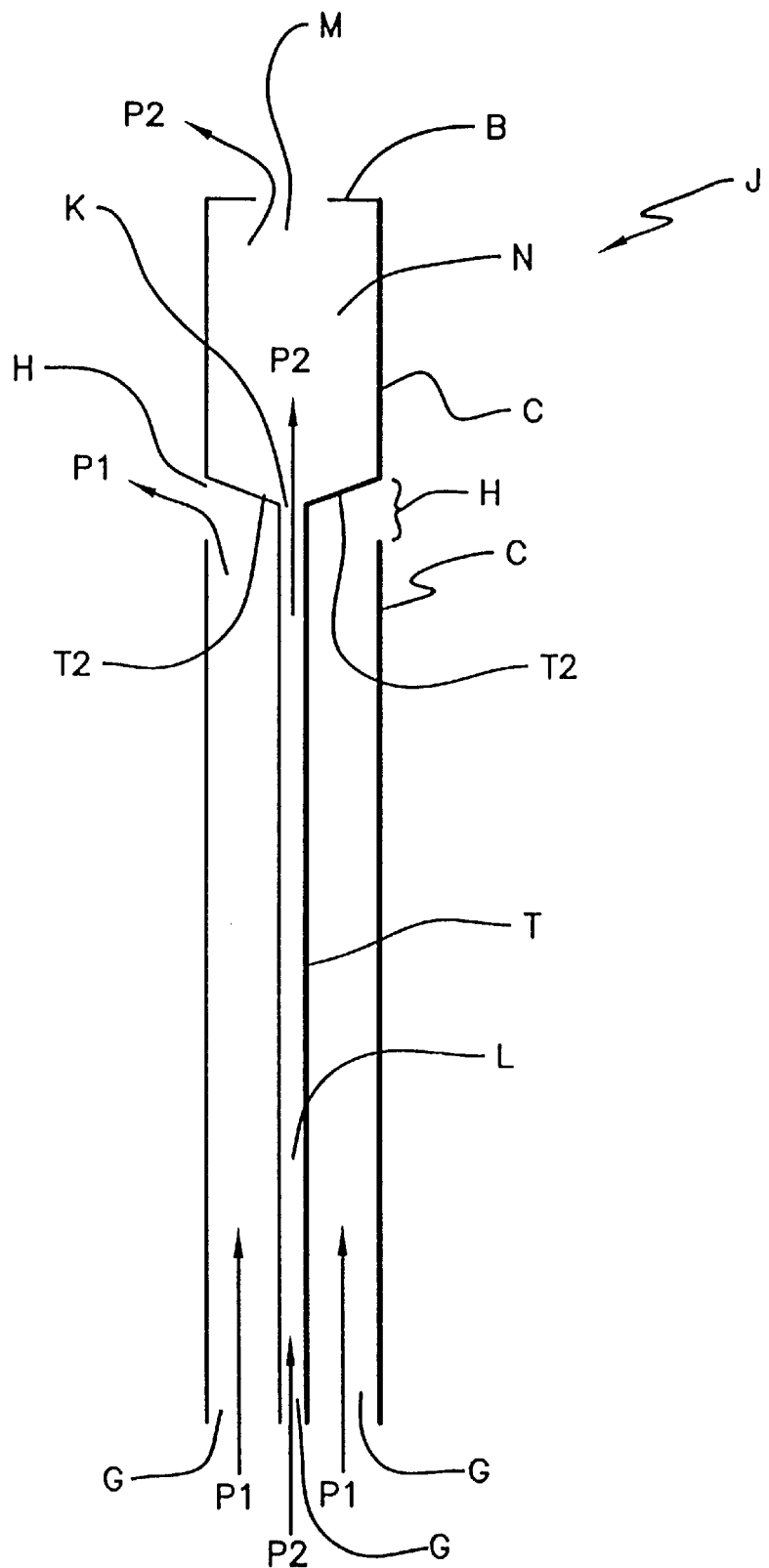
Figure 2:
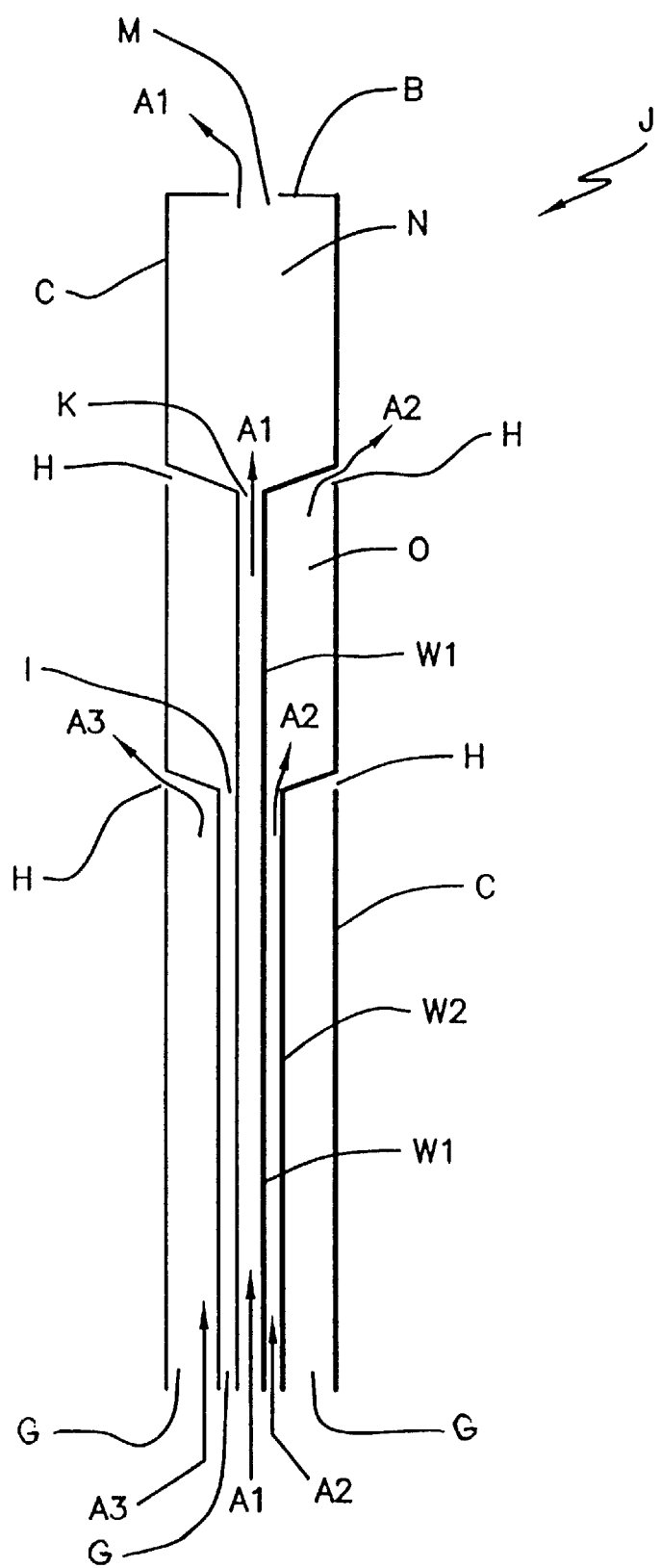

A sketch of the new water channel system J is shown in FIG. (1). The water channel system J takes the place of one or more fuel rods and is placed vertically in the fuel assembly. The main body of the channel is marked (C), which can be of a round or a square cross section or any other geometrical shape depending on the number and locations of the fuel rods it replaces. Inside the main body C, a narrow tube (T) extends vertically from the bottom of the fuel assembly and terminating T2 at a higher elevation preferably (approximately) at the two-thirds height of the fuel assembly. The system J divides the flow into two paths. The first flow path, which is marked (P1), starts at the bottom of the assembly, and travels through the main body (C) outside the narrow tube (T), and discharges through small holes (H) into the coolant stream. The second flow path (P2) starts at the bottom of the fuel assembly, and travels inside L the narrow tube (T) to its end K, and continues through the top part N of the main body (C) and discharges at the top B of the fuel assembly. The size of the flow holes G a the entrance and exit, small holes H and discharge aperture M, of each flow path is used to control the flow rate through each path.

The basic principle of the new water channel system J operation is described next and compared with the prior art whenever appropriate to show the distinction.

Because of the discharge location for the flow path (P1) at two-thirds of the assembly height, the water in said flow path (P1) is exposed to approximately two-thirds of the total heating radiation compared with the water channel of the prior art. This reduction in the energy deposition allows proportional reduction in the flow rate necessary to prevent boiling in flow path (P1), i.e., two-thirds of the flow that would be necessary for a water channel of the prior art is sufficient to prevent boiling. The entire flow of path (P1) is discharged into the coolant stream and participates in the cooling of the fuel rods and in the moderation of the neutrons in the upper third of the core where such addition is greatly advantageous. This reintroduction of flow path (P1) water into the coolant stream is the main purpose of the invention.

The amount of the flow directed through the second flow path (P2) is approximately one-half the flow directed into the flow path (P1). The second flow path (P2) travels through the narrow tube (T) for the approximate distance of two-thirds of the fuel assembly height. Because the flow area of the narrow tube (T) is small compared with that of the main body (C), the flow velocity in the said inner narrow tube T is increase resulting in small radiation field residence time of the water flowing therein. Therefore, both residence time and volume exposed to radiation are greatly reduced for the water flowing through the inner narrow tube (T). It can be concluded that the temperature (and enthalpy) of the water exiting the inner narrow tube T is approximately unchanged compared with the inlet condition as the heating is negligible. The water exiting the inner tube T enters the main body (C) where it serves as a neutron moderator for the upper one-third of the fuel assembly. The amount of radiation heating in the upper part of the main body (C) will barely heat up the water in the second flow path (P2) to saturation condition, so that boiling will not occur, which guarantees the proper performance of the water channel system J as a neutron moderator in the upper third of the fuel assembly.

Now, compare with a water channel of the prior art with the same outer dimensions and using the same amount of water, the new water channel system J 1. Performs the same neutron moderation function at all elevations, 2. Discharges two-thirds of the water into the top third of the fuel assembly where such water is needed for additional cooling and neutron moderation.

It must be noted that the new water channel system J is a general concept which can be embodied in more than one flow split. The next higher order embodiment is sketched in FIG. (2), where three flow paths are identified. One of the flow paths (A1) travels nearly unheated through narrow tube (W1) and discharges into the main body and exits at the top B of the fuel assembly at discharge aperture M. The second flow path (A2) travels through a shorter narrow tube (W2) and fills an intermediate (O) section of the main body C before it discharges into the coolant stream at the end of the narrow tube K. The third flow path (A3) travels through the main body (C) and discharges at the height or end of I of the shorter narrow tube (W2) through main body small holes H to join the coolant stream. In this manner, more of the water channel system J flow ends up merging with the coolant flow compared with a single flow split as shown in Fig (1). The number of the flow splits and flow rates in each flow path and discharge elevations are design parameters which can be optimized for specific fuel assembly designs. The narrow tube (W1) is placed inside the shorter narrow tube (W2) in this embodiment, but other narrow tube locations are also possible.

In addition to saving a large fraction of the water channel flow for neutron moderation and cooling in the upper part of the reactor core where there is generally a shortage of water, the new water channel system J serves as a dynamic stabilizer for density waves. As explained in the background section, the density wave instability depends on the time delay of density changes, and the consequent pressure drop in the boiling section, in response to a flow perturbation. It is obvious that the water channel system discharge into the main coolant flow is out-of-phase with the latter, with the result that the pressure drop changes being dampened which stabilizes the flow in the assembly against the density wave mode. In addition, the introduction of the water channel system discharge flow into the upper part of the assembly reduces the void fraction and the two-phase pressure drop relative to the single phase pressure drop, which is a stabilizing effect. Finally, the water channel system discharge increases the moderation in the top section of the assembly which causes the neutron flux (and fission power) to shift upward. The said upward shift of the axial power distribution has a stabilizing effect on density waves.

What is claimed is:

1. A nuclear fuel assembly comprising:

a nuclear fuel assembly for boiling water reactors; the fuel assembly comprising one or a plurality of fuel rods within the fuel assembly; the fuel assembly having a top and a bottom; a coolant flow flowing from the fuel assembly bottom to top; one or more water channel systems, positioned within the fuel assembly, each having one or a plurality of parallel flow splits guided by internal flow structures with flow discharge into the coolant flow at intermediate heights; said internal flow structures comprised of at least one narrow flow structure circumferentially surrounded by at least one outer flow structure; and said flow discharge from each of the one or a plurality of parallel flow splits flowing through a plurality of small holes.

2. A nuclear fuel assembly of claim 1 further comprising:

A. the one or more channel systems replaces one or more fuel rods and are placed vertically in the fuel assembly from fuel assembly bottom to top;

B. each of the one or more water channel systems has a main body; said main body, receiving a portion of the coolant flow, composing a first flow path; coolant flow received at the bottom at flow holes (G);

C. a narrow tube (T), having and end (K) and an inside (L), is received into and is circumferentially surrounded by the main body and extends vertically from the bottom of the fuel assembly toward the top of the fuel assembly and terminating (T2) at its end (K) intermediate the bottom and the top within the main body; the narrow tube, receiving a portion of the coolant flow, composing a second flow path; coolant flow input received at the bottom at flow holes (G);

D. the first flow path commences at the fuel assembly bottom, extends through the main body (C) outside the narrow tube (T), and discharges through the plurality of small holes formed in the main body; said plurality of small holes allowing discharge (H) of the first flow path into the coolant stream; the intermediate height of said discharge (H) at two-thirds of the assembly height;

E. the second flow path (P2) commences at the bottom of the fuel assembly, extends inside the narrow tube (T) to its end K, and continues through a top part (N) of the main body (C) and discharges at the top (B) of the fuel assembly through a discharge aperture (M).

3. A system of claim 2, further comprising:

A. the one or more water channel systems main body having a cross section configuration dependent on the number and locations of fuel rods it replaces;

B. the narrow tube (T) terminating (T2) and its end (K) at an elevation within the main body approximately a the two-thirds height of the fuel assembly;

C. the size of the main body and the narrow tube, at the fuel assembly bottom, the plurality of small holes and the discharge aperture are sized to control the flow rate through each of the first and second flow path.

4. A system of claim 3 further comprising:

A. the flow rate through each of the first and second flow path is controlled such that the flow directed through the second flow path (P2) is approximately one-half the flow directed into the first flow path (P1); a flow area of the narrow tube (T) is small compared with a flow area of the main body (C); a flow velocity in the narrow tube (T) is increased in resulting in small radiation field residence time of the coolant flow therein; both residence time and volume exposed to radiation are greatly reduced for the coolant flow in the second flow path through the narrow tube (T) at its end (K) is approximately unchanged compared with the coolant flow at the narrow tube a the fuel assembly bottom; the coolant flow of the second flow path exiting the inner narrow tube (T) enters the top part (N) of the main body (C) where it serves as a neutron moderator for approximately the upper one-third of the fuel assembly; the flow rate controlled such that the amount of radiation heating in the opt part (N) of the main body (C) will barely heat up the water in the second flow path (P2) to saturation condition, so that boiling will not occur insuring the proper performance of the water channel system (J) as a neutron moderator in the upper third of the fuel assembly.

5. A system of claim 4 further comprising:

A. constant neutron moderation function at all elevations,

B. flow rate controlled to discharge approximately two-thirds of the total water channel flow, the discharge being even in all lateral directions, into the top third of the fuel assembly in near saturation state where such water is needed for additional cooling and neutron moderation.

6. A system of claim 5 further comprising:

A. the main body receiving and circumferentially surrounding at least one narrow tube and directing more than a first and second flow path.

7. A system of claim 6 further comprising:

A. a shorter narrow tube (W2), having an end (I), received by and circumferentially surrounded by the main body at the bottom of the fuel assembly;

B. the at least one narrow tube (W1) received into and circumferentially surrounded by the shorter narrow tube a the bottom of the fuel assembly; the at least one narrow tube receiving a portion of the coolant flow as a flow path (A1) at the bottom of the fuel assembly with said flow path (A1) discharging at the at least one narrow tube end (K) into the top part (N) of the main (C) and discharging from the top (B) of the main body (C) at discharge aperture (M);

C. the shorter narrow tube (W2) receiving a portion of the coolant flow as a second flow path (A2) which fills an intermediate section of the main body (O) before discharging through a plurality of small holes (H) into the coolant flow;

D. a third flow path (A3) formed by the main body and discharging at the end of the shorter narrow tube (I) through a plurality of small holes into the coolant flow; said plurality of small holes uniformly arrayed and discharging the third flow path (A3) at the end of the shorter narrow tube at a common height positioned intermediate the fuel assembly top and bottom; said plurality of small holes uniformly arrayed and discharging the second flow path (A2) at the end of the narrow tube at a common height positioned intermediate the fuel assembly top and the plurality of small holes discharging the third flow path (A3).

8. A system of claim 7 further comprising:

A. the at least one narrow tube (W1) is concentric with the shorter narrow tube (W2); the shorter narrow tube is concentric with the main body;

B. the small holes positioned for coolant discharge form the second flow path (A2) and the third flow path (A3) such that the discharge of said second flow path (A2) and third flow path (A3) through the small holes and into the coolant flow is out-of-phase with the coolant flow during density wave oscillations.

\* \* \* \* \*